United States Patent
Cui et al.

(10) Patent No.: US 11,246,065 B2
(45) Date of Patent: Feb. 8, 2022

(54) METHOD, APPARATUS, TERMINAL AND STORAGE MEDIUM FOR MEASUREMENT REPORT

(71) Applicant: Beijing Xiaomi Mobile Software Co., Ltd., Beijing (CN)

(72) Inventors: Hengbin Cui, Beijing (CN); Long Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 138 days.

(21) Appl. No.: 16/840,120

(22) Filed: Apr. 3, 2020

(65) Prior Publication Data

US 2021/0092652 A1    Mar. 25, 2021

(30) Foreign Application Priority Data

Sep. 23, 2019 (CN) .......................... 201910901197.9

(51) Int. Cl.
| | |
|---|---|
| *H04W 36/00* | (2009.01) |
| *H04W 36/08* | (2009.01) |
| *H04W 36/18* | (2009.01) |
| *H04W 36/36* | (2009.01) |
| *H04W 88/06* | (2009.01) |

(52) U.S. Cl.
CPC ....... *H04W 36/0058* (2018.08); *H04W 36/08* (2013.01); *H04W 36/18* (2013.01); *H04W 36/365* (2013.01); *H04W 88/06* (2013.01)

(58) Field of Classification Search
CPC ............................ H04W 36/365; H04W 88/06
See application file for complete search history.

(56) References Cited

U.S. PATENT DOCUMENTS

| | | |
|---|---|---|
| 2014/0087717 A1 | 3/2014 | Cherian et al. |
| 2019/0069229 A1 | 2/2019 | Lee et al. |
| 2020/0267605 A1 | 8/2020 | Bae et al. |

FOREIGN PATENT DOCUMENTS

| | | |
|---|---|---|
| CN | 103716852 A | 4/2014 |
| CN | 107466080 A | 12/2017 |
| CN | 108307417 A | 7/2018 |
| GB | 2501954 A | 11/2013 |
| KR | 20190027624 A | 3/2019 |
| KR | 20190052761 A | 5/2019 |
| WO | WO 2017200269 A1 | 11/2017 |

(Continued)

OTHER PUBLICATIONS

Extended European Search Report in European Application No. 20162951.6, dated Sep. 14, 2020.

(Continued)

*Primary Examiner* — James P Duffy
(74) *Attorney, Agent, or Firm* — Finnegan, Henderson, Farabow, Garrett & Dunner, L.L.P.

(57) ABSTRACT

A method for sending a measurement report, includes: after receiving an enable signal of a second network, a first modem starting up a timer and sending a startup signal to a second modem; when the timer expires, the first modem sending a tracking area update (TAU) request to a network side device; the first modem receiving a measurement configuration sent by the network-side device, and instructing the second modem after startup to measure the second network according to the measurement configuration to obtain a measurement report; and reporting the measurement report to the network-side device.

20 Claims, 9 Drawing Sheets

(56) References Cited

FOREIGN PATENT DOCUMENTS

| WO | WO 2018/080230 A1 | 5/2018 |
| WO | WO 2018/090340 A1 | 5/2018 |
| WO | WO 2018/172408 A1 | 9/2018 |
| WO | WO 2019/050349 A1 | 3/2019 |
| WO | WO 2020/027616 A1 | 2/2020 |

OTHER PUBLICATIONS

Grant of Patent for Korean Application No. 10-2019-7038582, dated Jul. 12, 2021, 3 pages.
English version of International Search Report in International Application No. PCT/CN2019/120805, dated Jun. 23, 2020.
International Search Report Issued in Application No. PCT/CN2019/120805, dated Jun. 23, 2020, 5 pages.

METHOD, APPARATUS, TERMINAL AND STORAGE MEDIUM FOR MEASUREMENT REPORT

CROSS-REFERENCE TO RELATED APPLICATION

This application is based upon and claims priority to Chinese Patent Application No. 201910901197.9, filed on Sep. 23, 2019, the entire contents thereof are incorporated herein by reference.

TECHNICAL FIELD

The present disclosure relates to the field of mobile communication, and in particular, to a method, an apparatus, a terminal, and a storage medium for sending a measurement report.

BACKGROUND

A 5G mobile communication system supports both non-standalone networking (NSA) and standalone networking (SA). In an NSA system, both a 4G modem and a 5G modem are provided in a 5G mobile phone.

A user interface (UI) on the 5G mobile phone provides a switch on-off control for the 5G network. When a user clicks the on-off control, the running 4G modem sends a TAU request to the network side of the NSA system, and at the same time the 5G modem is started up. After receiving the TAU request, the network side sends the measurement configuration of the 5G cell to the 4G modem. After the 5G modem starts up, the 4G modem informs the 5G modem of the measurement configuration. After measuring the 5G cell according to the measurement configuration, the 5G modem reports a measurement report to the network side through the 4G modem.

The network side needs to receive the measurement report of the 5G mobile phone within, e.g., 3 seconds, from issuing the measurement configuration, otherwise the subsequent measurement report will be ignored. However, since the startup process of the 5G modem takes about 3 seconds, and the measurement process takes about 0.5 seconds, the total time of 3.5 seconds is longer than 3 seconds required by the network side.

SUMMARY

The embodiments of the present disclosure provide a method, an apparatus, a terminal, and a storage medium for sending a measurement report.

In a first aspect, there is provided a method for sending a measurement report, applied to user equipment (UE) having a first modem and a second modem, the first modem corresponding to a first network and the second modem corresponding to a second network. The method includes: after receiving an enable signal of the second network, starting up a timer and sending a startup signal to the second modem by the first modem; when the timer expires, sending, by the first modem, a tracking area update (TAU) request to a network-side device, the TAU request being configured to request a connection to the second network, and a timing duration of the timer being not less than a startup duration of the second modem; and receiving, by the first modem, a measurement configuration sent by the network-side device, instructing, by the first modem, the second modem after startup to measure the second network according to the measurement configuration, to obtain the measurement report, and reporting, by the first modem, the measurement report to the network-side device.

In a second aspect, there is provided an apparatus for sending a measurement report, the apparatus including: a processor controlling a first modem and a second modem, the first modem corresponding to a first network, and the second modem corresponding to a second network; and a memory storing instructions executable by the processor. The processor is configured to: after receiving an enable signal of the second network, start up a timer and send a startup signal to the second modem; when the timer expires, send a tracking area update (TAU) request to a network-side device, the TAU request being configured to request a connection to the second network, and a timing duration of the timer being not less than a startup duration of the second modem; and receive a measurement configuration sent by the network-side device, instruct the second modem after startup to measure the second network according to the measurement configuration to obtain the measurement report, and report the measurement report to the network-side device.

In a third aspect, there is provided a non-transitory computer-readable storage medium. The computer-readable storage medium stores at least one instruction that, when executed by a processor of a device, causes the device to perform a method for sending a measurement report according to the first aspect.

The beneficial effects brought by the technical solutions provided in the embodiments of the present disclosure include at least: by setting a timer in the UE and setting the timing duration of the timer, it may be ensured that the TAU can be sent after the second modem is started up, thereby ensuring that the network-side device can receive the measurement report fed back by the UE in a short time, avoiding the situation that the network-side device removes the TAU request of the UE due to the long startup time of the second modem, which may ensure that the second modem can access the second network in a timely manner.

It should be understood that the above general description and the following detailed description are merely exemplary and explanatory, and should not limit the present disclosure.

BRIEF DESCRIPTION OF THE DRAWINGS

The accompanying drawings, which are incorporated in the specification and constitute a part of this specification, illustrate embodiments consistent with the present disclosure and explain the principles of the present disclosure together with the specification.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In embodiments of the present disclosure, a modem may be a communication chip set in a user terminal, also referred to as user equipment (UE). The chip may include a modulation function and/or a demodulation function. The modulation function may convert a digital signal into a wireless signal; and the demodulation function may convert a wireless signal into a digital signal. With the modulation and demodulation functions, the information in the UE that needs to be transmitted over the network can be converted from a digital signal transmitted inside the UE into a wireless signal for transmission over the network (air interface), or the wireless signal received via the network (air interface) can be converted into a digital signal transmitted inside the UE.

In an embodiment, one modem is correspondingly connected to one network. In an embodiment, one modem is correspondingly connected to one network, and the connected network may support dual connection with other network while connecting with this modem.

In embodiments of the present disclosure, a tracking area update (TAU) is an update in a tracking area (TA), e.g., based on a corresponding area concept in an Evolved Packet System (EPS). For an Evolved Packet Core (EPC), a UE that is in an idle or connected state may need to manage its registered TA. The UE may correspondingly change the registration information in the EPC when the TA changes. When the UE is available, the TAU may inform the EPC of its status. The TAU may be transmitted by a modem, and the sending process of the TAU may be triggered by a timer and a modem.

In embodiments of the present disclosure, a user interface (UI) may be an interface through which the UE interacts with a user. The user may instruct the UE to execute an instruction through an operation on the UI. The manner in which the user performs an operation on the UI may include: controlling by a touch operation, controlling by a physical key operation, recognition of a gesture of the user by a camera and an AI chip, and the like.

Figure 1:
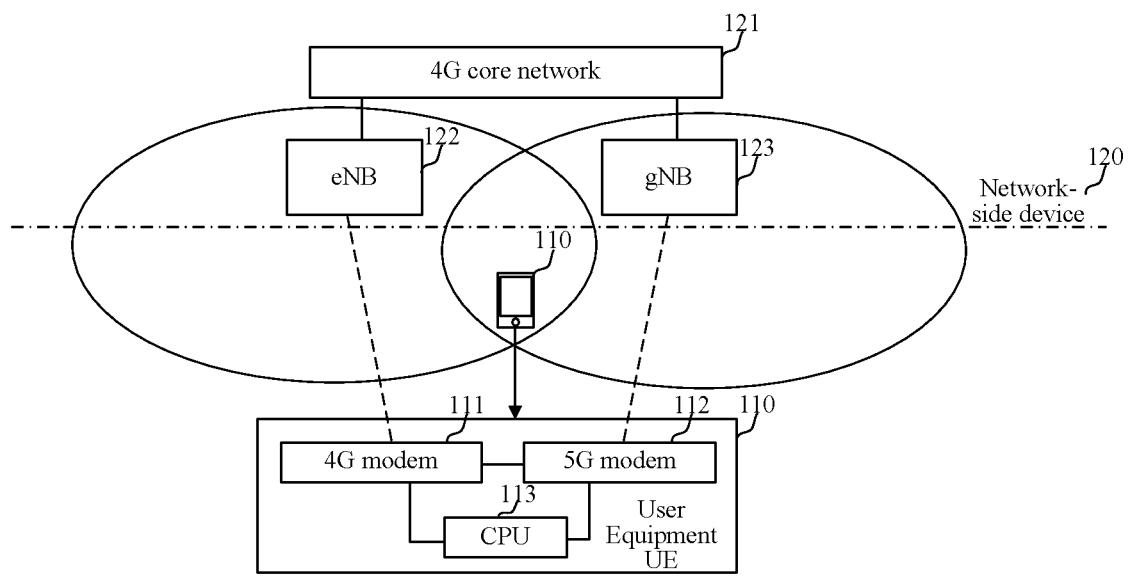
FIG. 1 illustrates a block diagram of a communication system according to an exemplary embodiment of the present disclosure.

FIG. 1 illustrates a block diagram of a communication system according to an exemplary embodiment of the present disclosure. FIG. 1 shows a dual connection manner between UE 110 and a network-side device 120.

The UE 110 may include a 4G modem 111, a 5G modem 112, and a Central Processing Unit (CPU) 113.

The network-side device 120 may include: each core network element in a 4G core network 121, and two access network element eNB 122 and gNB 123 of the access network. In an embodiment, the network-side device 120 is networked in a non-standalone (NSA) manner. In an embodiment, the access network element includes an LTE base station as the eNB 122 and an NR base station as the gNB 123. The eNB 122 is connected to the UE 110 through the 4G modem 111, and the gNB 123 is connected to the UE through the 5G modem 112. When the UE 110 is connected to the network-side device 120 in the form of dual connectivity, the eNB 122 serves as a master node base station and the gNB 123 serves as a slave node base station, that is, the control plane functions are all handled by the eNB 122, and the gNB 123 is configured to provide a service for the user plane data, thereby fully utilizing the advantages of relatively mature and extensive control plane deployment range of the eNB 122 and fast user plane data transmission speed of the gNB 123. In an embodiment, the gNB 123 and the eNB 122 communicate through a core network element. In an embodiment, the gNB 123 and the eNB 122 are connected through an inter-base station interface.

Figure 2:
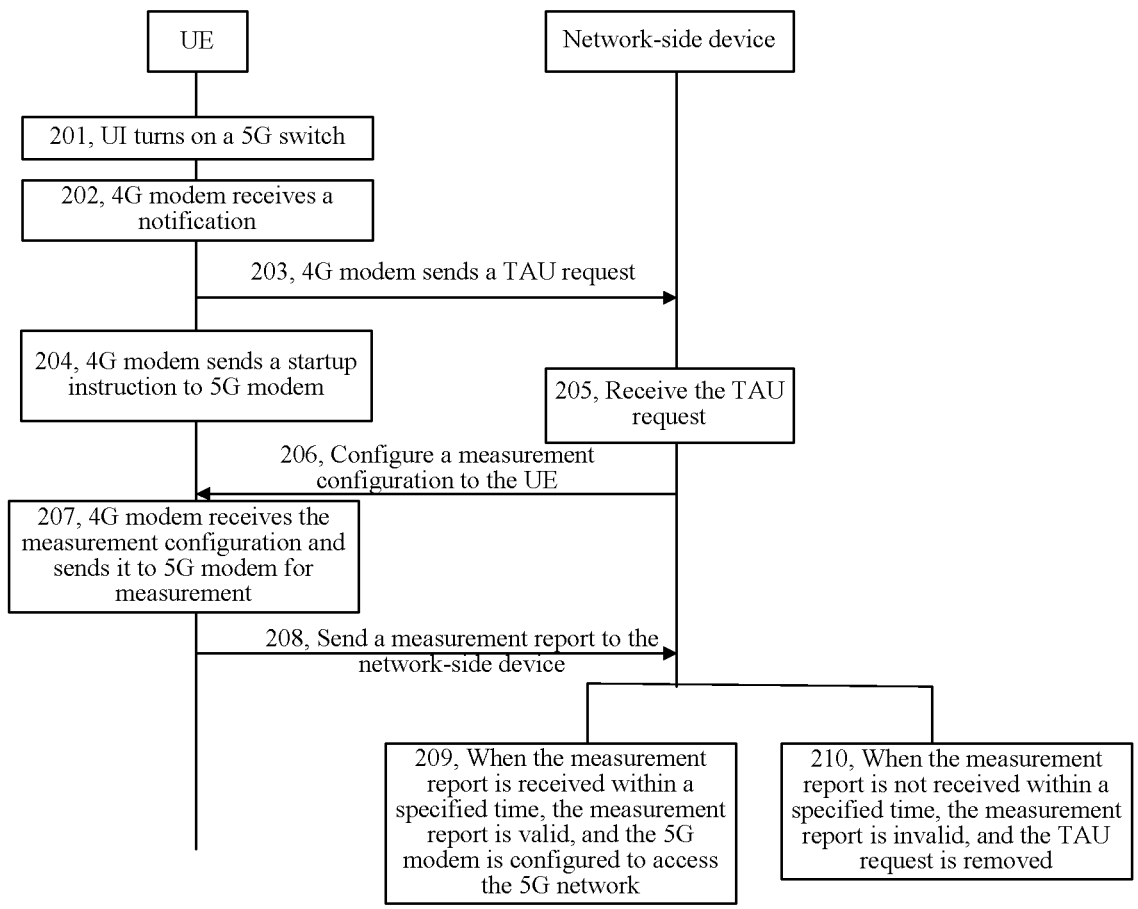
FIG. 2 illustrates a flowchart of a method for sending a measurement report according to some embodiments.

FIG. 2 illustrates a flowchart of a method for sending a measurement report according to some embodiments. The method is applied to a UE having both a 4G modem and a 5G modem. The method includes the following steps.

In step 201, the UI turns on a 5G switch.

The user may turn on the 5G switch by operating on the UI. The way for turning on includes: the user changing the 5G switch on the UI from an off state to an on state.

Before the 5G switch is turned on, the UE may have connected with the network-side device, and the manner in which the UE connects with the network-side device includes: using a 4G modem to connect to the 4G network provided by the network-side device.

The 4G modem corresponds to a 4G network, the 5G modem corresponds to a 5G network, and the 5G network has the capability of dual connection with the 4G network.

In step 202, the 4G modem receives a notification.

Through the CPU configured in the UE, the 4G modem receives a notification of turning on the 5G switch from the UI.

In step 203, the 4G modem sends a TAU request to the network-side device.

In step 204, the 4G modem sends a 5G instruction to the 5G modem.

The step 203 is performed in synchronization with the step 204. After receiving the notification of turning on the 5G switch from the UI, the 4G modem immediately sends a TAU request to the network-side device, to notify of sending a startup instruction to the 5G modem.

In step 205, the network-side device receives the TAU request.

In step 206, the network-side device configures a measurement configuration to the UE.

The measurement configuration performed by the network-side device on the UE is a test performed by the network-side device of whether the UE has the ability of accessing the network. The measurement in the measurement configuration may represent a measurement on the 5G network.

In step 207, the 4G modem receives the measurement configuration and sends it to the 5G modem for measurement.

Because the startup time of the 5G modem is longer than the time from when the 4G modem sends the TAU request to the network-side device to when the network-side device configures the measurement configuration for the UE, the measurement configuration is received by the 4G modem, and after the 5G modem is started up, the measurement configuration is sent by the 4G modem to the 5G modem for measurement.

In step 208, the 5G modem sends a measurement report to the network-side device.

Immediately after the 5G modem is started up, a measurement report is generated according to the measurement configuration, and the measurement report is sent to the network-side device.

When the network-side device receives the measurement report within the specified time, step 209 is executed, it is considered that the measurement report is valid, and the 5G modem is configured to access the 5G network; and when the network-side device does not receive the measurement report within the specified time, step 210 is performed, the measurement report is invalid, and the TAU request is removed.

After the network-side device configures the measurement configuration for the UE, a specified time may be provided. When the measurement report fed back by the UE is not received within the specified time, the network-side device removes the TAU request. At this time, even if the 5G modem completes the sending of the measurement report, it may not connect to the 5G network.

Embodiments of the present disclosure also provide a method and an apparatus for sending a measurement report, which may improve the above embodiments.

Figure 3:
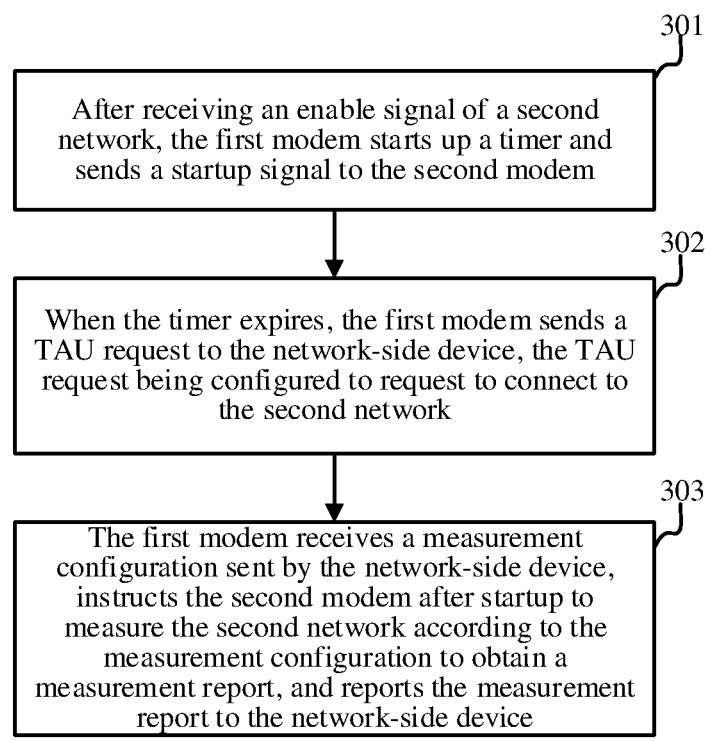
FIG. 3 illustrates a flowchart of a method for sending a measurement report according to an exemplary embodiment of the present disclosure.

FIG. 3 shows a flowchart of a method for sending a measurement report according to an exemplary embodiment of the present disclosure. The method is applied to a UE having both a first modem (such as a 4G Modem) and a second modem (such as a 5G Modem). The method includes the following steps.

In step 301, after receiving an enable signal of a second network, the first modem starts up a timer and sends a startup signal to the second modem.

In this embodiment, the UE includes the first modem and the second modem. The networks that the UE can access include a first network and the second network. The first modem may correspond to the first network, and the second modem may correspond to the second network.

When the first modem corresponds to the first network, the first modem has a protocol corresponding to the first network, and can complete the process including: converting a digital signal into a wireless signal, sending the wireless signal to a network-side device of the first network, receiving a wireless signal of the network-side device of the first network, and converting the received wireless signal into a digital signal.

When the second modem corresponds to the second network, the second modem has a protocol corresponding to the second network, and can complete the process including: converting a digital signal into a wireless signal, sending the wireless signal to a network-side device of the second network, receiving a wireless signal of the network-side device of the second network, and converting the received wireless signal into a digital signal.

In an embodiment, the second network is a network having a capability of providing service to the UE in a dual connection form with the first network. For example, the first network is a 4G network, and the second network is a 5G network, and the 5G network has the capability of dual connection with the 4G network. Accordingly, the first modem is a 4G modem chip, and the second modem is a 5G modem chip. Further, in some embodiments, the first modem may not modulate the digital signal corresponding to the second modem, nor may it demodulate the wireless signal corresponding to the second modem.

In an embodiment, the first modem is in a working state when the enable signal of the second network is received, that is, the first network has been accessed through the first modem. The second modem is in a sleep state (or inactive state or off state) when the enable signal of the second network is received, that is, the second modem is not started up or the second modem is not connected to the network. Because the first modem may not demodulate the wireless signal of the second network, or may not modulate the digital information to be sent to the second network, it may be necessary to send a startup signal to the second modem through the first modem, so as to start up the second modem.

The timer has the function of maintaining a time sequence of the signaling process in the non-access layer in the Long Term Evolution (LTE) wireless system. The timer has the states of starting timing, restarting timing, and timing timeout. In an embodiment, the timer may start timing when timing is needed. During the timing, if a condition is met, the timing is stopped, and when needing timing again, the timing is restarted. If the timer expires, a timer timeout state is entered. In the timer timeout state, the timer may trigger other processes.

In an embodiment, the timer is a T3411 timer. When the T3411 timer is in the timer timeout state, other process may be performed. The other process includes triggering the first modem to retransmit the TAU request.

In step 302, when the timer expires, the first modem sends a TAU request to the network-side device, the TAU request being configured to request to connect to the second network.

When the timer expires, the timer triggers the timeout. In an embodiment, when the T3411 timer times out, it may trigger the first modem to resend the TAU request.

The default period of the T3411 timer is 10 s. In an embodiment, in order to ensure the receiving time of the network-side device, the duration of the timer is set to be not less than the startup time of the second modem. In In an embodiment, the startup time of the second modem is 3 s, and the timing duration of the T3411 timer is set to 3 s or 3.5 s or 4 s.

The timing duration of the timer indicates one cycle duration of timing of the timer. When this cycle duration is exceeded, the timer triggers the timeout.

Further, sending the TAU request to the network-side device may also performed by starting a TAU process. When the first modem receives the signal from the second network, the TAU process is started and a TAU request is sent. In an embodiment, to ensure that the TAU request is sent after the second modem is started up, the sending of the TAU request is ignored, a timer is started up, and a startup signal is sent to the second modem.

In step 303, the first modem receives a measurement configuration sent by the network-side device, instructs the second modem after startup to measure the second network according to the measurement configuration to obtain a measurement report, and reports the measurement report to the network-side device.

When the network-side device receives the TAU request sent by the first modem, it sends a measurement configuration to the device terminal.

In an embodiment, the measurement configuration is configured by the eNB and sent to the 4G modem in the UE. In an embodiment, the measurement configuration includes at least one of an object (e.g., a 5G cell) needed to be measured by the UE, a cell list (e.g., a 5G cell list), a report method, a measurement identifier, and a time parameter.

In an embodiment, the network-side device determines whether the second modem can connect to the second network by sending the measurement configuration to the first modem.

In an embodiment, after receiving the measurement configuration from the network-side device, the first modem instructs the second modem after startup to measure the second network.

In an embodiment, after the first modem receives the measurement configuration from the network-side device, if the startup of the second modem has not been completed, then the first modem temporarily stores the measurement configuration. When the second modem is started up, the first modem instructs the second modem after the startup to measure the second network. After the second modem measures the second network, the second modem transmits the measurement result to the first modem, and the first modem reports the measurement report to the network-side device through the first network. In an embodiment, when the network-side device receives the measurement report within a certain period of time, it is determined that the second modem can connect to the second network; and when the network-side device does not receive the measurement report within a certain period of time, it is determined that the second modem cannot connect with the second network.

In an embodiment, when the network-side device receives the measurement report and determines that the second modem can connect to the second network, the network-side device sends a control trigger to the UE, and the second modem accesses the second network according to the control trigger. When the network-side device does not receive the measurement report within a certain period of time and determines that the second modem cannot connect to the second network, the TAU request sent by the first modem is removed.

In an embodiment, when the second modem is not accessed to the second network, the timer may enter a timeout state after one time of timing. In an embodiment, in the timeout state, the timer triggers the first modem, so that the first modem sends the TAU request to the network-side device again. In an embodiment, when the timeout action is to trigger the first modem to resend the TAU request to the network-side device, the network-side device may receive the TAU request again and resend the measurement configuration to the first modem until the second modem accesses the second network.

In the above embodiments, the timer in the UE and the timing duration of the timer are set to ensure that the TAU can be sent after the second modem is started up, thereby ensuring that the network-side device can receive a measurement report fed back by the UE within a short period of time, avoiding the situation where the network-side device removes the TAU request of the UE due to the long startup time of the second modem, and ensuring that the second modem can access the second network in a timely manner.

Figure 4:
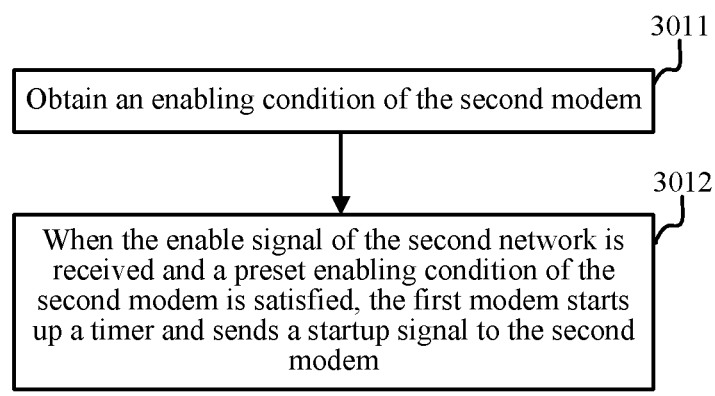
FIG. 4 illustrates a flowchart of a method for sending a measurement report according to an exemplary embodiment of the present disclosure.

FIG. 4 shows a flowchart of a method for sending a measurement report according to an exemplary embodiment of the present disclosure. In this embodiment, step 301 (FIG. 3) may include the following step 3011 and step 3012.

In step 3011, an enabling condition of the second modem is obtained.

In an embodiment, the enabling condition of the second modem by the UE comes from a user operation on the user interface. When the user operates the user interface, an enabling condition for the second modem is sent to the first modem.

In an embodiment, the enabling condition includes: the second modem has not been started up, and the current serving cell of the first network supports dual connectivity with the second network.

In an embodiment, the second modem having not been started up indicates that the second modem may be started up but is not started up, and the second modem is not connected to a cell different from the current serving cell of the first network.

In an embodiment, the network-side device is a network-side device that supports data transmission of both the first network and the second network. For example, the first modem is a 4G modem chip and the second modem is a 5G modem chip, then the network-side device is a network-side device that supports both 4G and 5G communication. In an embodiment, the network-side device uses LTE/NR double connection.

In an embodiment, the marking of the above enabling condition may be completed by setting a flag bit. The flag bit indicates a certain (or a specified) binary bit in a Call Manager (CM) module of the modem. In an embodiment, when an enabling condition is satisfied, a flag bit corresponding to the enabling condition is set as a target value, and when an enabling condition is not satisfied, a flag bit corresponding to the enabling condition is set to a non-target value. For example, the target value is 1 and the non-target value is 0. Further, the target value of 1 may be replaced by a target value of true (TURE), and the target value of 0 may be replaced by a target value of false (FALSE).

In an embodiment, the flag bit needs to be set in the modem in the working state, so the flag bit is set in the first modem in the working state.

In an embodiment, two flag bits may be set according to the foregoing enabling condition, and then two flag bits are set in the first modem, namely a first flag bit and a second flag bit. The first flag bit is configured to indicate whether the second modem has not been started up, and the second flag bit is configured to indicate whether the current serving cell of the first network supports dual connectivity with the second network.

In step 3012, when the enable signal of the second network is received and a preset enabling condition of the second modem is satisfied, the first modem starts up a timer and sends a startup signal to the second modem.

In an embodiment, by setting the first flag bit and the second flag bit, the determination of whether the enabling condition is satisfied may be implemented by the determination of whether the flag bit is the target value.

When the preset flag bits all meet the target value, it is determined that the enabling condition of the second modem is satisfied. At this time, the first modem enables the timer, and simultaneously sends the startup signal to the second modem.

In an exemplary embodiment, while the timer is enabled, other modules or devices in the UE may determine whether to enable the second modem through a voting mechanism. For example, the other modules in the UE include a first modem. When the data or instructions received by the first modem include a part that needs to enable the second modem, the first modem adds a voting of consent to the second modem. For example, the voting process is represented in the form of an assignment, and the first modem assigns a positive value to an enable event of the second modem. Other modules that do not need to enable the second modem may assign a negative value to the enable event of the second modem. A final voting structure may be expressed in the form of a score, and the voting has a threshold setting. When a score obtained by the voting of all modules that need to participate in the voting are greater than or equal to the threshold, the determination result is that the vote is passed and the second modem is enabled; and when the score is less than the threshold, the determination result is that the vote is not passed, and the second modem is not enabled.

In the above embodiments, by setting a timer in the UE, and setting the timing duration of the timer, it may be ensured that the TAU is sent after the second modem is started up, thereby ensuring that the second modem can receive the measurement configuration information of the first modem after the startup of the second modem is completed, which avoids the situation that the network-side device removes the TAU request of the UE due to the long startup time of the second modem, and ensures that the second modem can access the second network.

By presetting the enabling condition for the second modem, setting the flag bit in the CM module of the first modem, and determining whether the second modem can be enabled or not according to the value of the flag bit, the pre-detection of access of the second modem to the second network by the UE side is improved. Further, the voting detection may ensure that the enabling of the second modem satisfies the situation of the UE itself.

Figure 5:
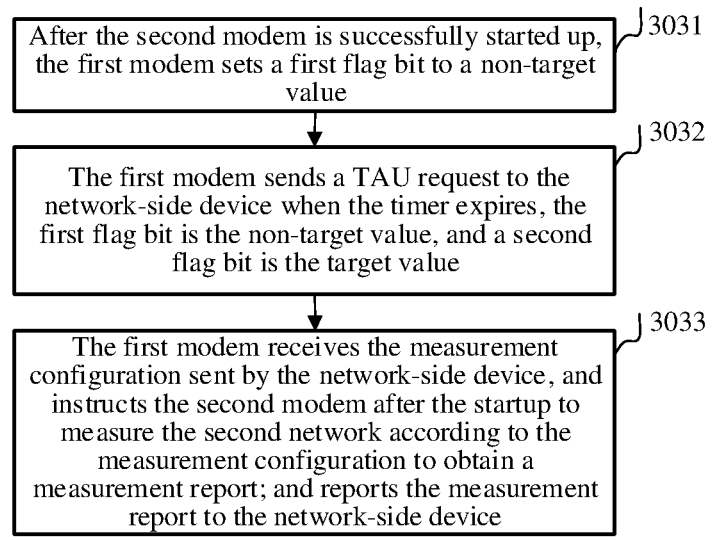
FIG. 5 illustrates a flowchart of a method for sending a measurement report according to an exemplary embodiment of the present disclosure.

FIG. 5 shows a flowchart of a method for sending a measurement report according to an exemplary embodiment of the present disclosure. In this embodiment, step 303 (FIG. 3) may include the following step 3031 to step 3033.

In step 3031, after the second modem is successfully started up, the first modem sets a first flag bit to a non-target value.

In an embodiment, the first flag bit indicates whether the second modem has not been started up, if the second modem has not been started up, the first flag bit is set to 1, and if the second modem has been started up, the first flag bit is set to 0. For example, after the second modem is successfully started up, the first flag bit is set to a non-target value, that is, 0, which means that the second modem does not need to be started up again, and the second demodulator has started to work.

In step 3032, the first modem sends a TAU request to the network-side device when the timer times out, the first flag bit is the non-target value, and a second flag bit is the target value.

In an embodiment, the second flag bit is configured to indicate whether the current serving cell of the first network supports dual connectivity with the second network. When the second flag bit is the target value, it indicates that the current serving cell can still support the dual connection between the first network and the second network.

In an embodiment, when the first flag bit is a non-target value, it means that the second demodulator has started to work. At this time, the first modem can directly send a TAU request to the network-side device without waiting.

Further, sending a TAU request to the network-side device may also be performed by starting a TAU process. In the TAU process, when the first modem receives the signal from the second network and the values of the first flag bit and the second flag bit are the target values, a TAU process is started to send a TAU request. In an embodiment, to ensure that the TAU request is sent after the second modem is started up, the sending of the TAU request is ignored, a timer is started, and a startup signal is sent to the second modem.

In step 3033, the first modem receives a measurement configuration sent by the network-side device, and instructs the second modem after the startup to measure the second network according to the measurement configuration to obtain a measurement report; and reports the measurement report to the network-side device.

When this TAU request is sent, the network-side device may still send the measurement configuration, and the second modem has already started up. According to the measurement configuration, the first modem may report the measurement report (which is measured and generated by the second modem) to the network-side device in a timely manner.

In the above embodiments, by setting a timer in the UE and setting the timing duration of the timer, it may be ensured that the TAU is sent after the second modem is started up, thereby ensuring that the measurement configuration information from the first modem can be received after the startup of the second modem is completed, which avoids the situation that the network-side device removes the TAU request of the UE due to the excessive startup time of the second modem, and ensures that the second modem can access the second network.

In addition, the extra setting of the first flag bit prevents the process suspension caused by the process conflict when the first modem resends the TAU message, and further ensures that the second modem can access the second network.

Figure 6:
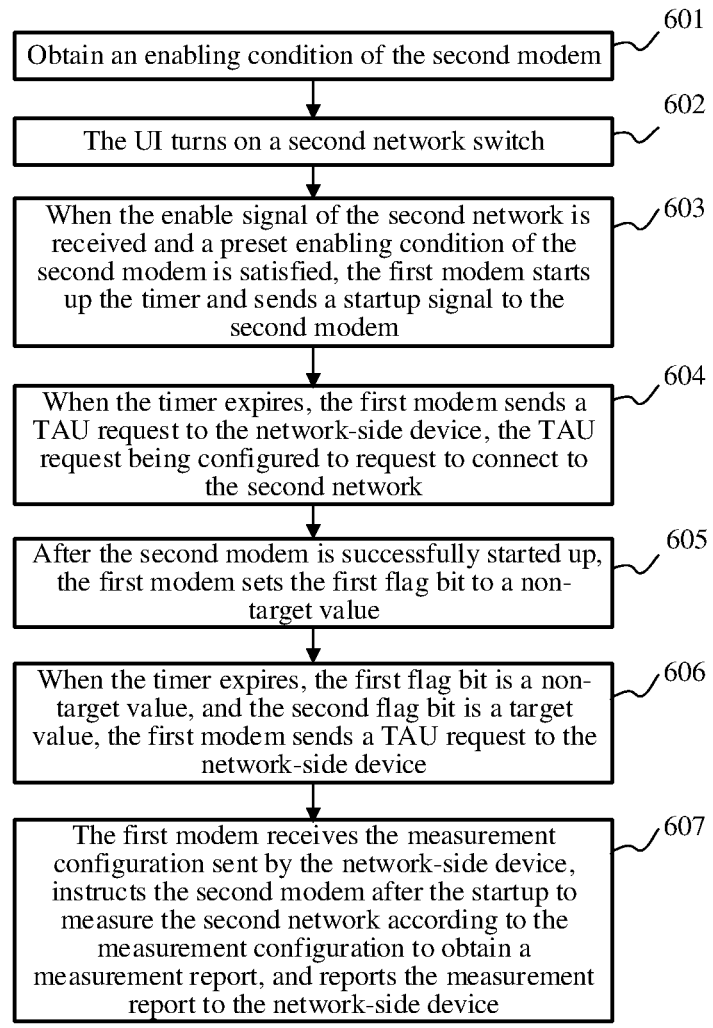
FIG. 6 illustrates a flowchart of a method for sending a measurement report according to an exemplary embodiment of the present disclosure.

FIG. 6 shows a flowchart of a method for sending a measurement report according to an exemplary embodiment of the present disclosure. The method is applied to a UE having both a first modem and a second modem. The method includes the following steps.

In step 601, an enabling condition of the second modem is obtained.

In an embodiment, the first modem corresponds to a first network, the second modem corresponds to a second network, and the second network is a network having a dual connection capability with the first network.

In an embodiment, the UE confirms whether the second modem can be enabled by enabling the modem of itself. When it is confirmed that the second modem can be enabled, it is also necessary to confirm whether the serving cell connected to the first modem supports dual connection with the second network.

In an embodiment, the first modem may not modulate the digital signal corresponding to the second modem, nor may it demodulate the wireless signal corresponding to the second modem.

In step 602, a UI turns on a second network switch.

In an embodiment, when the first modem is connected to the first network, the user turns on the second network switch on the UI, that is, the UI includes an on-off control of the second network.

In an embodiment, turning on the second network switch by the UI is equivalent to issuing an enabling condition to the second modem. At this time, the second modem has not been started up. The UE may determine whether the second modem can be enabled according to a preset enabling condition. In an embodiment, after confirming that the second modem is available or unavailable, the UE informs the user through the user interface.

In an embodiment, the enabling condition includes: the second modem has not been started up, and the current serving cell of the first network supports dual connectivity with the second network.

In an embodiment, the second modem has not been started up, indicating that the second modem can be started up but is not started up, and the second modem is not connected to a cell different from the current serving cell of the first network.

In an embodiment, the marking of the above enabling condition may be completed by setting a flag bit. The flag bit indicates a certain binary byte in the modem's Call Manager (CM) module. In an embodiment, when an enabling condition is satisfied, the flag bit corresponding to the enabling condition is set as a target value, and when an enabling condition is not satisfied, a flag bit corresponding to the enabling condition is set to a non-target value. For example, the target value is 1 and the non-target value is 0. Further, a target value of 1 may be replaced by a target value of true (TURE), and a target value of 0 may be replaced by a target value of false (FALSE).

In an embodiment, the flag bit needs to be set in the modem in the working state, so the flag bit is set in the first modem in the working state.

In an embodiment, according to the foregoing enabling condition, there are two flag bits, and then two flag bits are set in the first modem, namely a first flag bit and a second flag bit. The first flag bit is configured to indicate whether the modem has not been started up, and the second flag bit is configured to indicate whether the current serving cell of the first network supports dual connection with the second network.

In step 603, when the enable signal of the second network is received and a preset enabling condition of the second modem is satisfied, the first modem starts up the timer and sends a startup signal to the second modem.

The timer may start timing when it needs to count. During the timing, if the condition is met, the timer will stop counting, and when needing to count again, the timer restarts the timing.

If the timer expires, it may enter the timeout state. In the timeout state, the timer may trigger other processes. In an embodiment, the timer is a T3411 timer. When the T3411 timer is in the timeout state, other processes are performed, including triggering the first modem to resend the TAU request.

In an embodiment, by setting the first flag bit and the second flag bit, the first modem's determination of whether the enabling condition is satisfied may be implemented by the determination of whether the flag bit is the target value. When all the preset flag bits meet the target value, it is determined that the enabling condition of the second modem is satisfied.

At this time, the first modem enables the timer, and simultaneously sends a startup signal to the second modem.

Further, while the timer is enabled, other modules or devices in the UE may determine whether to enable the second modem through a voting mechanism. The other modules in the UE may include a first modem. When the data or instructions received by the first modem include a part that needs to enable the second modem, the first modem votes to agree to the second modem. Schematically, the voting process is represented in the form of an assignment, then the first modem assigns a positive value to the enable event of the second modem. In an embodiment, other modules that do not need to enable the second modem assign a negative value to the enable event of the second modem. In an embodiment, the final voting structure is expressed in the form of a score, and the voting has a threshold setting. When the score obtained after the voting of all modules that need to participate in the voting is greater than or equal to the threshold, the determination result is that the vote is passed, and the second modem is enabled; and when the score is less than the threshold, the determination result is that the vote is not passed, and the second modem is not enabled.

In an embodiment, after receiving the enable signal of the second network, the first modem starts the TAU process. However, when the first and second flags are the target values and the TAU request in the TAU process is a request to support the second network, the first modem temporarily ignores the sending of the TAU request (that is, the TAU request is not sent to the network-side device at this time), starts a timer and sends a startup signal to the second modem.

In step 604, when the timer expires, the first modem sends a TAU request to the network-side device, the TAU request being configured to request to connect to the second network.

When the timer expires, the timer triggers the timeout. For example, when the T3411 timer times out, it may trigger the first modem to resend the TAU request.

The default period of the T3411 timer is 10 s. In an embodiment, in order to ensure the receiving time of the network-side device, the duration of the timer is set to be not less than the startup time of the second modem. For example, if the startup time of the second modem is 3 s, then the timing duration of the T3411 timer is set to 3 s or 3.5 s or 4 s.

The timing duration of the timer indicates one cycle duration of timing of the timer. When the timer expires, the timer triggers the timeout.

Further, sending a TAU request to the network-side device may also be performed by starting a TAU process. In the TAU process, when the first modem receives the signal from the second network and the values of the first flag bit and the second flag bit are the target values, a TAU process is started to send a TAU request. In an embodiment, to ensure that the TAU request is sent after the second modem is started up, the sending of the TAU request is ignored, a timer is started, and a startup signal is sent to the second modem.

In step 605, after the second modem is successfully started up, the first modem sets the first flag bit to a non-target value.

In an embodiment, the first flag bit indicates whether the second modem has not been started up, if the second modem has not been started up, the first flag bit is set to 1, and if the second modem has been started up, the first flag bit is set to 0. For example, after the second modem is successfully started up, the first flag bit indicating whether the second modem has not been started up is set to a non-target value, that is, 0, which means that the second modem does not need to be started up again, and the second modem has started to work.

In step 606, when the timer expires, the first flag bit is a non-target value, and the second flag bit is a target value, the first modem sends a TAU request to the network-side device.

In an embodiment, the second flag bit is configured to indicate whether the current serving cell of the first network supports dual connectivity with the second network. When the second flag bit is the target value, it indicates that the current serving cell can still support the dual connection between the first network and the second network. In an embodiment, when the first flag bit is a non-target value, it means that the second demodulator has started to work. At this time, the first demodulator can directly send a TAU request to the network-side device without waiting.

In step 607, the first modem receives the measurement configuration sent by the network-side device, instructs the second modem after the startup to measure the second network according to the measurement configuration to obtain a measurement report, and reports the measurement report to the network-side device.

When the network-side device receives the TAU request sent by the first modem, it sends a measurement configuration to the UE. For example, the measurement configuration is configured by the eNB and is sent to the UE.

In an embodiment, the measurement configuration includes an object to be measured by the UE, a cell list, a report mode, a measurement identifier, a time parameter, and the like. In an embodiment, the network-side device determines whether the second modem can connect to the second network by sending a measurement configuration to the first modem.

In an embodiment, after receiving the measurement configuration from the network-side device, the first modem instructs the second modem after the startup to measure the second network.

In an embodiment, after the first modem receives the measurement configuration from the network-side device and the second modem has not completed startup, the first modem temporarily stores the measurement configuration. When the second modem starts, the first modem instructs the second modem after startup to measure the second network. After the second modem measures the second network, the second modem transmits the measurement result to the first modem, and the first modem reports the measurement report to the network-side device through the first network. In an embodiment, when the network-side device receives the measurement report within a certain period of time, it is determined that the second modem can connect to the second network; and when the network-side device does not receive the measurement report within a certain period of time, it is determined that the second modem cannot connect with the second network.

In an embodiment, when the network-side device receives the measurement report and determines that the second modem can connect to the second network, the second modem may directly access the second network. When the network-side device does not receive the measurement report within a certain period of time and determines that the second modem cannot connect to the second network, the TAU request sent by the first modem may be removed.

In an embodiment, when the second modem is not connected to the second network, the timer may enter a timeout state after one time of timing. In an embodiment, in the timeout state, the timer triggers the first modem, so that the first modem sends a TAU request to the network-side device again.

In an embodiment, when the timeout action is to trigger the first modem to resend the TAU request to the network-side device, the network-side device may receive the TAU request again and resend the measurement configuration to the first modem until the second modem accesses the second network.

In the above embodiments, by setting a timer in the UE and setting the timing duration of the timer, it may be ensured that the sending of TAU can be performed after the second modem is started up, thereby ensuring that the measurement configuration information from the first modem can be received after the startup of the second modem is completed, which avoids the situation that the network-side device removes the TAU request of the UE due to the excessive startup time of the second modem, and ensures that the second modem can access the second network.

In addition, the enabling condition and the setting a flag bit may ensure that the activation of the second modem is adapted to the state of the UE, and complete the UE's pre-work for the second modem to access the second network. The voting detection is used to ensure that the activation of the second modem meets the condition of the UE itself. At the same time, the extra setting of the first flag bit may prevent the process suspension caused by the process conflict when the first modem resends the TAU message, and may further ensure that the second modem can access the second network.

Figure 7:
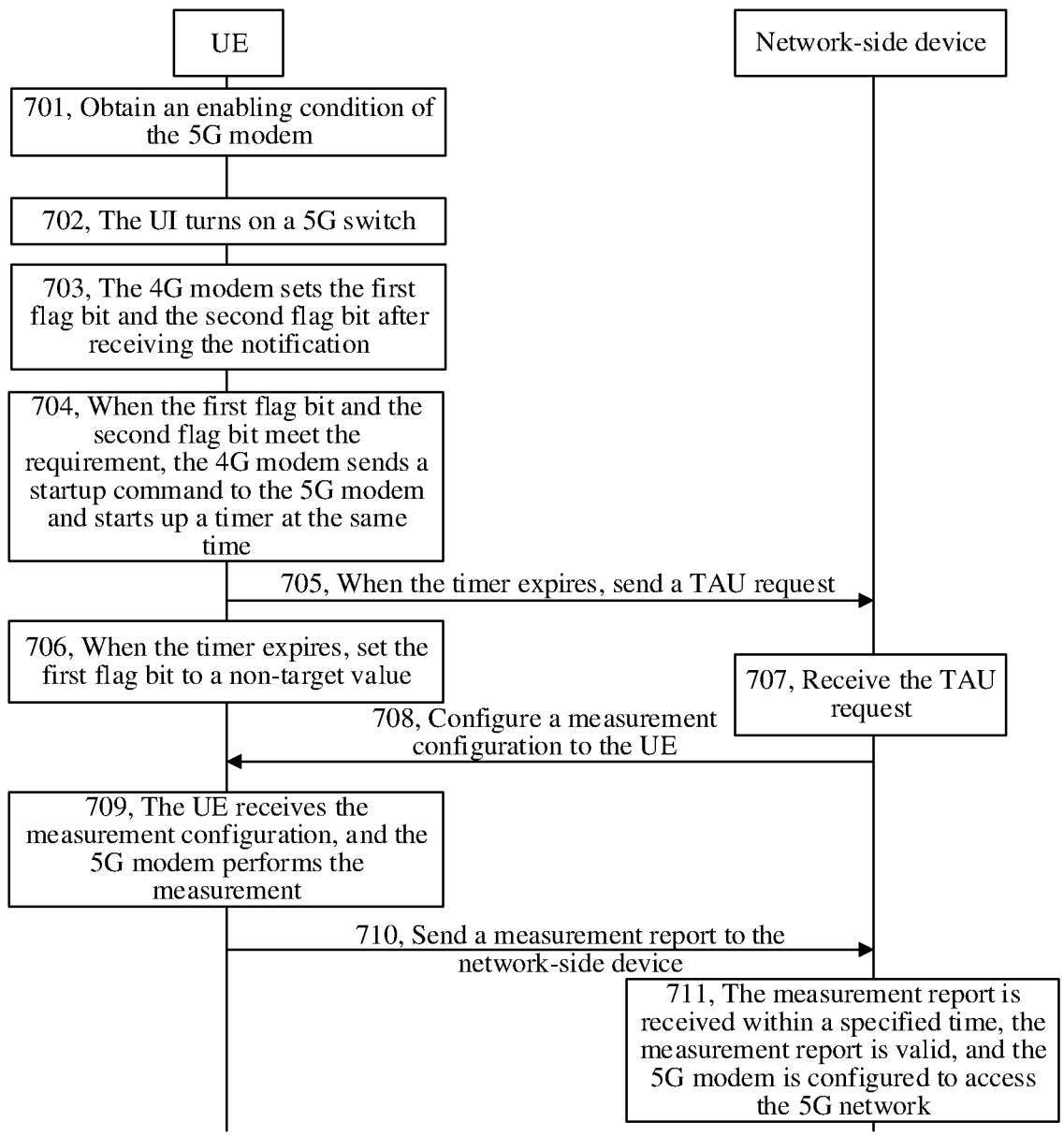
FIG. 7 illustrates a flowchart of an apparatus for sending a measurement report according to an exemplary embodiment of the present disclosure.

FIG. 7 shows a flowchart of a method for sending a measurement report according to an exemplary embodiment of the present disclosure. The method is applied to a UE having both a 4G modem and a 5G modem. The method includes the following steps.

In step 701, an enabling condition of the 5G modem is obtained.

In an embodiment, the enabling condition includes: the 5G modem has not been started, and the current serving cell of 4G supports dual connection with the 5G network.

In an embodiment, the second modem has not been started up, indicating that the second modem can be started up but is not started up, and the second modem is not connected to a cell different from the current serving cell of the first network.

In step 702, the UI turns on a 5G switch.

In this embodiment, the modem includes a 4G modem and a 5G modem. The 4G modem corresponds to the 4G network, the 5G modem corresponds to the 5G network, and the 5G network has the ability to dual-connect to the 4G network. Further, the 4G modem may not modulate the digital signal corresponding to the 5G network, nor may it demodulate the wireless signal sent by the network-side device to the 5G modem.

The UI turns on the 5G switch, that is, the UI sends an enable signal to the 5G modem. The enable signal is generated after the CPU of the UE receives an enable operation on the user interface. In an embodiment, the user interface is a mobile phone interface, and the enable operation is that the user turns on the 5G switch on the mobile phone interface.

In an embodiment, turning on the 5G switch by the UI is performed on the basis that the 4G modem has been connected to the 4G network.

Further, the UI interface includes a switch control of 5G.

In step 703, the 4G modem sets a first flag bit and a second flag bit after receiving the 5G switch instruction.

In an embodiment, because the 5G modem has not been started up, the CPU sends the instruction to the 4G modem after receiving the instruction on the user interface. After receiving the 5G switch instruction, the 4G modem sets the first flag bit and the second flag bit.

In an embodiment, the flag bit needs to be set in the 4G modem.

In an embodiment, the first flag bit is configured to indicate whether the 5G modem has not been started up. In one example, the name of the first flag bit is set to NR_ON_Delay, which is configured to indicate whether the 5G modem has not been started up.

For example, the setting logic of the NR_ON_Delay flag is as follows:

If (old-mode without 5G bit) && (new-mode have 5G bit)
NR_ON_Delay=1;
If (new-mode without 5G bit)
NR_ON_Delay=0;

Here, "old-mode" represents the connection mode before the UI operation, and "new-mode" represents the connection mode after the UI operation; "old-mode without 5G bit" represents that the original connection between the modem and the network-side device is a non-5G connection, in this embodiment, it is 4G connection; "new-mode have 5G bit" means that 5G connection needs to be included in the new connection mode; "new-mode without 5G bit" means that 5G connection does not need to be included in the new connection mode. That is, when the original connection between the modem and the network-side device is a non-5G connection and the new connection mode needs to include a 5G connection, the flag bit of NR_ON_Delay is set to 1, and when the new connection mode does not need to include the 5G connection, the flag bit of NR_ON_Delay is set to 0.

The second flag bit is configured to indicate whether the current serving cell of the 4G network supports dual connectivity with 5G. For example, the name of the second flag bit is set to ENDC, which is configured to indicate whether the current serving cell of the 4G network supports dual connection with 5G.

For example, the setting logic of the ENDC flag is as follows:

If (sib2_upr_layer_ind_value)
ENDC=TURE or 1;
Else
ENDC=FALSE or 0;

Here, sib2_upr_layer_ind_value indicates whether the cell corresponding to the 4G network currently connected to the 4G modem supports dual connection with 5G.

In an embodiment, a dncr identifier is set, which is configured to detect that the corresponding connection capability between the UE and 5G network after the startup of the 5G modem is created from scratch.

In an embodiment, the marking of the above enabling condition may be completed by setting a flag bit. The flag bit indicates a certain binary byte in the modem's Call Manager (CM) module. In an embodiment, when an enabling condition is satisfied, a flag position corresponding to the enabling condition is set as a target value, and when an enabling condition is not satisfied, a flag position corresponding to the enabling condition is set to a non-target value. For example, the target value is 1 and the non-target value is 0. Further, a target value of 1 may be replaced by a target value of true (TURE), and a target value of 0 may be replaced by a target value of false (FALSE).

In step 704, when both the first flag bit and the second flag bit meet the requirements, the 4G modem sends a startup command to the 5G modem and starts a timer at the same time.

In an embodiment, by setting the first flag bit and the second flag bit, the determination of the 4G modem as to whether the enabling condition is satisfied is implemented by a determination as to whether the flag bit is a target value. When all the preset flag bits meet the target value, it is determined that the enabling condition of the 5G modem is met. At this time, the 4G modem enables the timer and sends a startup signal to the 5G modem.

Further, while the timer is enabled, a voting mechanism may be configured to allow other modules or devices within the UE to determine whether the 5G modem needs to be enabled. Other modules in the UE may include a 4G modem. When the data or instruction received by the 4G modem includes a part that needs to enable the 5G modem, the 4G modem votes to agree to the 5G modem. For example, the voting process is represented in the form of an assignment, and the 4G modem assigns a positive value to an enable event of the 5G modem. In an embodiment, other modules that do not need to enable the 5G modem assign a negative value to the enable event of the 5G modem. In an embodiment, the final voting structure is expressed in the form of a score, and the voting has a threshold setting. When the score obtained after the voting of all modules that need to participate in the voting is greater than or equal to the threshold, it is determined that the vote is passed and the 5G modem is enabled; and when the score is less than the threshold, it is determined that the vote is not passed and the 5G modem is not enabled.

In this embodiment, the first flag bit and the second flag bit meet the enabling condition at the same time, which means that the 5G modem needs to be started up and the current serving cell of the 4G network supports dual connection with 5G. At this time, the 4G modem sends a startup trigger to the 5G modem and the timer is enabled.

The timer has the role of maintaining the time sequence of the signaling process in the non-access layer in the LTE wireless system. The timer has the states of starting timing, restarting timing, timing timeout, etc. In an embodiment, the timer may start timing when timing is needed. During the timing, if the condition is met, the timing is stopped, and the timing is restarted when the timing needs to be started again. If the timer expires, it may enter the timeout state. In the timeout state, the timer may trigger other processes. For example, the timer is a T3411 timer. When the T3411 timer is in the timeout state, other processes are performed, including triggering the first modem to retransmit the TAU request.

The 4G modem starts the TAU process after receiving the enable signal of the second network. However, when the first flag bit and the second flag bit both have the target value "1", and the TAU request in the TAU process is a request that supports 5G network, the 4G Modem ignores the sending of the TAU request, starts the timer, and sends a startup signal to the 5G Modem, e.g., as follows:

If ((NR_ON_Delay==1) && ENDC==1))
Start timer T3411 without Xs;

Here, "Start timer T3411" represents starting up the timer T3411, and "Xs" represents the timing period of the timer T3411. When it exceeds X seconds, the timer will time out. The timing period of the T3411 timer may be 3 seconds. For example, when the values of the first flag bit NR_ON_Delay indicating whether the 5G modem has not been started and the second flag bit ENDC indicating whether the current serving cell of the 4G network supports dual connection with 5G are both "1", the timer 3411 is started, and the timer is set to expire after X seconds.

In step 705, when the timer expires, the 4G modem sends a TAU request to the network-side device.

Because the timing duration of the timer is not less than the startup time of the 5G modem, when the timer expires, it may indicate that the 5G modem has been started up.

The default period of the T3411 timer is 10 s. In an embodiment, in order to ensure the receiving time of the network-side device, the duration of the timer is set to be not less than the startup time of the 5G modem. For example, if the startup time of the 5G modem is 3 s, then the timing duration of the T3411 timer is set to 4 s.

The timing duration of the timer indicates the duration of one timing cycle of the timer. When the timer expires, the timer triggers the timeout.

Further, sending a TAU request to the network-side device may be also performed by starting a TAU process. In the TAU process, when the 4G modem receives the signal of the 5G network, a TAU process will be started to send a TAU request. In an embodiment, to ensure that the TAU request is sent after the 5G modem is started up, the sending of the TAU request is ignored, the timer is started, and a startup signal is sent to the 5G modem.

In step 706, when the timer expires, the first flag bit is set to a non-target value.

Because the timing duration of the timer is not less than the startup time of the 5G modem, when the timer expires, it can indicate that the 5G modem has been started up. After the 5G modem is successfully started up, setting the first flag bit to a non-target value means that it is not necessary to start up the 5G modem again, e.g., as follows:

If (5G MODEM STATUS UP==TURE)
NR_ON_Delay=FALSE or 0;

Here, "5G MODEM STATUS UP" means that the 5G modem has been started up, and TRUE indicates that the event is true. That is, when the 5G modem is started up, the first flag bit is set to a non-target value.

In step 707, the network-side device receives the TAU request.

In step 708, the network-side device configures a measurement configuration to the UE.

The steps 707 and 708 are actions of the network-side device after receiving the TAU request. The network-side device configures the measurement configuration and sends it to the UE. If the UE can send back a measurement report to the network-side device within a specified time, the network-side device configures the 5G modem to access the 5G network.

In step 709, the UE receives the measurement configuration, and the 5G modem performs the measurement.

In an embodiment, because the 4G modem sends a TAU request to the UE, the 4G modem receives the measurement configuration and sends it to the already started 5G modem for measurement; optionally, the 5G modem is started up, so the 5G modem directly receives the measurement configuration and performs the measurement. After the measurement, the 5G modem may obtain a measurement report.

In step 710, the UE sends a measurement report to the network-side device.

In step 711, the network-side device receives the measurement report within a specified time, the measurement report is valid, and the 5G modem is configured to access the 5G network.

In response to the measurement configuration sent by the network-side device, the 5G modem after startup obtains a measurement report, and reports the measurement report to the network-side device, so that the 5G modem and the 5G network are successfully connected.

In the above embodiments, by setting a timer in the UE and setting the timing duration of the timer, it may be ensured that the sending of TAU can be performed after the 5G modem is started up, and then it may be ensured that the 5G modem can receive the measurement configuration information from the 4G modem after the startup is completed, thereby avoiding the situation that the network-side device removes the TAU request of the UE due to the long startup time of the 5G modem, and ensuring that the 5G modem can access the 5G network.

Figure 8:
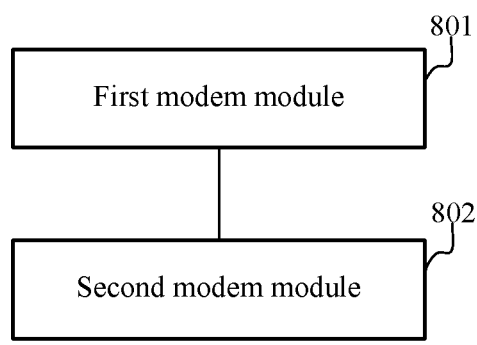
FIG. 8 illustrates a schematic diagram of a device for sending a measurement report according to an exemplary embodiment of the present disclosure.

FIG. 8 illustrates a block diagram of an apparatus for sending a measurement report according to an exemplary embodiment of the present disclosure. The apparatus may include a first modem module 801 and a second modem module 802.

The first modem module 801 is configured to, after receiving an enable signal of the second network, start up a timer and send a startup signal to the second modem module; when the timer expires, send a tracking area update (TAU) request to the network-side device, the TAU request being configured to request to connect to the second network; the timing duration of the timer being not less than the startup time of the second modem module; receive a measurement configuration sent by the network-side device, and instruct the second modem module 802 after startup to measure the second network according to the measurement configuration to obtain a measurement report; and report the measurement report to the network-side device.

In an embodiment, the first modem module 801 is configured to, when the enable signal of the second network is received and the enabling condition is met, start a timer and send a startup signal to the second modem.

The enabling condition includes: the second modem 802 has not been started up, and the current serving cell belonging to the first network supports establishing a dual connection with the second network.

In an embodiment, the first modem module 801 is further configured to, after receiving the enable signal of the second network, determine a first flag bit and a second flag bit.

The first modem module is further configured to, when the first flag bit and the second flag bit are both target values, start a timer and send a startup signal to the second modem module 802.

The first flag bit with a target value is configured to indicate that the second modem has not been started up, and the second flag bit with a target value is configured to indicate that the current serving cell belonging to the first network supports establishing a dual connection with the second network.

In an embodiment, the first modem module 801 is further configured to start a TAU process after receiving the enable signal of the second network.

The first modem module 801 is further configured to, when the first flag bit and the second flag bit are both the target value and the TAU request in the TAU process is a request to support the second network, ignore sending of the TAU request, start the timer and send a startup signal to the second modem module 802.

In an embodiment, the first modem module 801 is further configured to set the first flag bit to a non-target value after the second modem module is successfully started, the first flag bit having the non-target value being configured to indicate that the second modem module 802 has been started up.

The first modem module 801 is further configured to, when the timer expires, the first flag bit is a non-target value, and the second flag bit is a target value, send a TAU request to the network-side device, the TAU request is a request to support the second network.

In an embodiment, the timer is a T3411 timer.

In an embodiment, the first modem module 801 is configured to receive a measurement configuration sent by the network-side device, instruct the second modem module 802 after startup to perform measurement on the second network according to the measurement configuration to obtain a measurement report, and report the measurement report to the network-side device.

Figure 9:
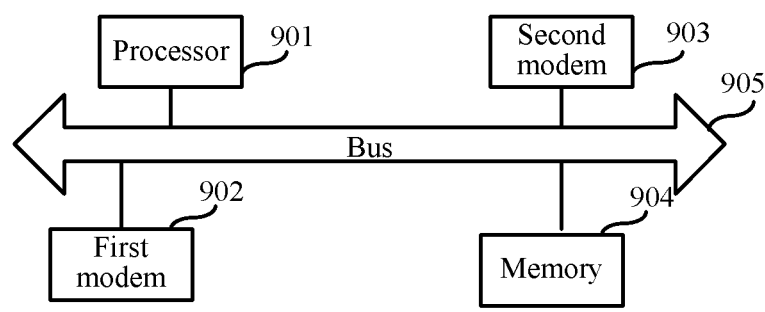
FIG. 9 illustrates a schematic structural diagram of a device for sending a measurement report according to an exemplary embodiment of the present disclosure.

FIG. 9 is a schematic diagram of a device for sending a measurement report according to an exemplary embodiment of the present disclosure. The device may include a processor 901, a first modem 902, a second modem 903, and a memory 904.

In an embodiment, the processor 901 includes one or more processing cores, and the processor 901 executes various functional applications and information processing by running software programs and modules.

In an embodiment, the first modem 902 and the second modem 903 may be implemented as a communication component, and the communication component may be a communication chip.

In an embodiment, the memory 904 is connected to the processor 901 through a bus 905.

The memory 904 may be configured to store at least one instruction, and the processor 901 is configured to execute the at least one instruction to perform the above-described methods.

An exemplary embodiment of the present disclosure also provides a computer-readable storage medium, the computer-readable storage medium stores at least one instruction, at least one program, code set, or instruction set, and the at least one instruction, the at least one program, the code set, or the instruction set is loaded and executed by the processor to implement a method for sending a measurement report provided by each of the foregoing method embodiments.

It shall be understood that the term "and/or" describes an association relationship of associated objects, and represents that there may be three relationships. For example, A and/or B may represent three situations including the single existence of A, the simultaneous existence of A and B, and the single existence of B. The symbol "/" generally represents that contextual objects are in an "or" relationship.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The communication system and the service scenario described in the embodiments of the present application are used to more clearly illustrate the technical solutions of the embodiments of the present application, and do not constitute a limitation on the technical solutions provided in the embodiments of the present application. Those of ordinary skill in the art may know that, as evolution of the communication system and the emergence of new service scenarios, the technical solutions provided in the embodiments of the present application are also applicable to similar technical problems.

What is claimed is:

1. A method for sending a measurement report, applied to user equipment (UE) having a first modem and a second modem, the first modem corresponding to a first network and the second modem corresponding to a second network, the method comprising:
    after receiving an enable signal of the second network, starting up a timer and sending a startup signal to the second modem by the first modem;
    when the timer expires, sending, by the first modem, a tracking area update (TAU) request to a network-side device, the TAU request being configured to request a connection to the second network, and a timing duration of the timer being not less than a startup duration of the second modem; and
    receiving, by the first modem, a measurement configuration sent by the network-side device, instructing, by the first modem, the second modem after startup to measure the second network according to the measurement configuration, to obtain the measurement report, and reporting, by the first modem, the measurement report to the network-side device.

2. The method according to claim 1, wherein after receiving the enable signal of the second network, starting up the timer and sending the enable signal to the second modem by the first modem comprises:
    when the enable signal of the second network is received and an enabling condition is satisfied, starting up the timer and sending the startup signal to the second modem by the first modem;
    wherein the enabling condition comprises: the second modem has not been started up, and a current serving cell belonging to the first network supports establishing a dual connection with the second network.

3. The method according to claim 2, wherein when the enable signal of the second network is received and the enabling condition is satisfied, starting up the timer and sending the enable signal to the second modem by the first modem comprises:
    determining, by the first modem, a first flag bit and a second flag bit after receiving the enable signal of the second network; and
    when the first flag bit and the second flag bit are target values, starting up the timer and sending the startup signal to the second modem by the first modem;
    wherein the first flag bit having the target value indicates that the second modem has not been started up, and the second flag bit having the target value indicates that the current serving cell belonging to the first network supports establishing the dual connection with the second network.

4. The method according to claim 3, further comprising:
    after receiving the enable signal of the second network, starting up, by the first modem, a TAU process;
    wherein when the first flag bit and the second flag bit are the target values, starting up the timer and sending the enable signal to the second modem by the first modem comprises:
    when the first flag bit and the second flag bit are the target values and the TAU request in the TAU process is a request supporting the second network, ignoring sending of the TAU request, starting up the timer and sending the startup signal to the second modem by the first modem.

5. The method according to claim 3, further comprising:
    after the second modem is successfully started up, setting, by the first modem, the first flag bit to be a non-target value, the first flag bit having the non-target value indicating that the second modem has been started up;

wherein when the timer expires, sending, by the first modem, the TAU request to the network-side device comprises:
when the timer expires, the first flag bit is the non-target value, and the second flag bit is the target value, sending, by the first modem, the TAU request to the network-side device, the TAU request being a request supporting the second network.

6. The method according to claim 3, wherein the timer is a T3411 timer.

7. The method according to claim 1, further comprising:
receiving, by the first modem, the enable signal of the second network sent by a processor, wherein the enable signal is generated after the processor receives an enable operation on a user interface, and the user interface comprises a switch control of the second network.

8. An apparatus for sending a measurement report, comprising:
a processor controlling a first modem and a second modem, the first modem corresponding to a first network, and the second modem corresponding to a second network; and
a memory storing instructions executable by the processor;
wherein the processor is configured to:
after receiving an enable signal of the second network, start up a timer and send a startup signal to the second modem;
when the timer expires, send a tracking area update (TAU) request to a network-side device, the TAU request being configured to request a connection to the second network, and a timing duration of the timer being not less than a startup duration of the second modem; and
receive a measurement configuration sent by the network-side device, instruct the second modem after startup to measure the second network according to the measurement configuration to obtain the measurement report, and report the measurement report to the network-side device.

9. The apparatus according to claim 8, wherein:
the processor is further configured to, when the enable signal of the second network is received and an enabling condition is satisfied, start up the timer and send the startup signal to the second modem;
wherein the enabling condition comprises: the second modem has not been started up, and a current serving cell belonging to the first network supports establishing a dual connection with the second network.

10. The apparatus according to claim 9, wherein the processor is further configured to:
determine a first flag bit and a second flag bit after receiving the enable signal of the second network; and
when the first flag bit and the second flag bit are target values, start up the timer and send the startup signal to the second modem;
wherein the first flag bit having the target value indicates that the second modem module has not been started up, and the second flag bit having the target value indicates that a current serving cell belonging to the first network supports establishing the dual connection with the second network.

11. The apparatus according to claim 10, wherein the processor is further configured to:
after receiving the enable signal of the second network, start up a TAU process; and when the first flag bit and the second flag bit are the target values and the TAU request in the TAU process is a request supporting the second network, ignore sending of the TAU request, start up the timer and send the startup signal to the second modem.

12. The apparatus according to claim 10, wherein the processor is further configured to:
after the second modem is successfully started up, set the first flag bit to be a non-target value, the first flag bit having the non-target value indicating that the second modem module has been started up; and
when the timer expires, the first flag bit is the non-target value, and the second flag bit is a target value, send the TAU request to the network-side device, the TAU request being a request supporting the second network.

13. The apparatus according to claim 10, wherein the timer is a T3411 timer.

14. The apparatus according to claim 8, wherein the processor is further configured to:
generating the enable signal of the second network after the processor receives an enable operation on a user interface, the user interface including a switch control of the second network.

15. A non-transitory computer-readable storage medium having stored thereon at least one instruction that, when executed by a processor of a device, causes the device to perform a method for sending a measurement report, the device having a first modem and a second modem, the first modem corresponding to a first network and the second modem corresponding to a second network, the method comprising:
after receiving an enable signal of the second network, starting up a timer and sending a startup signal to the second modem by the first modem;
when the timer expires, sending, by the first modem, a tracking area update (TAU) request to a network-side device, the TAU request being configured to request a connection to the second network, and a timing duration of the timer being not less than a startup duration of the second modem; and
receiving, by the first modem, a measurement configuration sent by the network-side device, instructing, by the first modem, the second modem after startup to measure the second network according to the measurement configuration, to obtain the measurement report, and reporting, by the first modem, the measurement report to the network-side device.

16. The non-transitory computer-readable storage medium according to claim 15, wherein after receiving the enable signal of the second network, starting up the timer and sending the enable signal to the second modem by the first modem comprises:
when the enable signal of the second network is received and an enabling condition is satisfied, starting up the timer and sending the startup signal to the second modem by the first modem;
wherein the enabling condition comprises: the second modem has not been started up, and a current serving cell belonging to the first network supports establishing a dual connection with the second network.

17. The non-transitory computer-readable storage medium according to claim 16, wherein when the enable signal of the second network is received and the enabling condition is satisfied, starting up the timer and sending the enable signal to the second modem by the first modem comprises:

determining, by the first modem, a first flag bit and a second flag bit after receiving the enable signal of the second network; and when the first flag bit and the second flag bit are target values, starting up the timer and sending the startup signal to the second modem by the first modem;

wherein the first flag bit having the target value indicates that the second modem has not been started up, and the second flag bit having the target value indicates that the current serving cell belonging to the first network supports establishing the dual connection with the second network.

18. The non-transitory computer-readable storage medium according to claim 17, the method further comprising:

after receiving the enable signal of the second network, starting up, by the first modem, a TAU process;

wherein when the first flag bit and the second flag bit are the target values, starting up the timer and sending the enable signal to the second modem by the first modem comprises:

when the first flag bit and the second flag bit are the target values and the TAU request in the TAU process is a request supporting the second network, ignoring sending of the TAU request, starting up the timer and sending the startup signal to the second modem by the first modem.

19. The non-transitory computer-readable storage medium according to claim 17, the method further comprising:

after the second modem is successfully started up, setting, by the first modem, the first flag bit to be a non-target value, the first flag bit having the non-target value indicating that the second modem has been started up;

wherein when the timer expires, sending, by the first modem, the TAU request to the network-side device comprises:

when the timer expires, the first flag bit is the non-target value, and the second flag bit is the target value, sending, by the first modem, the TAU request to the network-side device, the TAU request being a request supporting the second network.

20. The non-transitory computer-readable storage medium according to claim 17, wherein the timer is a T3411 timer.

\* \* \* \* \*